US011913395B2

United States Patent
An et al.

(10) Patent No.: US 11,913,395 B2
(45) Date of Patent: Feb. 27, 2024

(54) INTELLIGENT CONTROL METHOD, APPARATUS, STORAGE MEDIUM AND DEVICE FOR ENGINE INITIATION

(71) Applicants: ZHEJIANG GEELY HOLDING GROUP CO., LTD., Hangzhou (CN); NINGBO GEELY ROYAL ENGINE COMPONENTS CO., LTD., Ningbo (CN); Aurobay Technology Co., Ltd., Ningbo (CN)

(72) Inventors: Conghui An, Zhejiang (CN); Yiqiang Liu, Zhejiang (CN); Zhiwei Qiao, Zhejiang (CN); Changming Jin, Zhejiang (CN); Zhengxing Dai, Zhejiang (CN); Jiang Tang, Zhejiang (CN); Junjie Guo, Zhejiang (CN)

(73) Assignees: ZHEJIANG GEELY HOLDING GROUP CO., LTD., Hangzhou (CN); NINGBO GEELY ROYAL ENGINE COMPONENTS CO., LTD., Ningbo (CN); Aurobay Technology Co., Ltd., Ningbo (CN)

( * ) Notice: Subject to any disclaimer, the term of this patent is extended or adjusted under 35 U.S.C. 154(b) by 0 days.

(21) Appl. No.: 18/031,612

(22) PCT Filed: Nov. 19, 2021

(86) PCT No.: PCT/CN2021/131720
§ 371 (c)(1),
(2) Date: Apr. 12, 2023

(87) PCT Pub. No.: WO2022/111388
PCT Pub. Date: Jun. 2, 2022

(65) Prior Publication Data
US 2023/0407803 A1    Dec. 21, 2023

(30) Foreign Application Priority Data

Nov. 24, 2020 (CN) .................. 202011332449.X

(51) Int. Cl.
F02D 41/02 (2006.01)
F01N 3/20 (2006.01)

(52) U.S. Cl.
CPC ....... F02D 41/0255 (2013.01); F01N 3/2013 (2013.01); *F02D 2200/0802* (2013.01); *F02D 2200/50* (2013.01)

(58) Field of Classification Search
CPC ........ F02D 41/02; F02D 41/0255; F01N 3/20; F01N 3/2013
(Continued)

(56) References Cited

U.S. PATENT DOCUMENTS 8,914,178 B2 * 12/2014 Yamazaki ............. B60W 10/08
701/22
2010/0152938 A1 * 6/2010 Aoki ..................... B60K 6/448
903/930
(Continued)

FOREIGN PATENT DOCUMENTS

| CN | 101357633 A | 2/2009 |
| CN | 102003258 A | 4/2011 |

(Continued)

OTHER PUBLICATIONS

European Search Report dated Sep. 25, 2023 for European Patent Application No. 21896889.9.
(Continued)

*Primary Examiner* — John Kwon
*Assistant Examiner* — Johnny H Hoang
(74) *Attorney, Agent, or Firm* — Ling Wu; Stephen Yang; Ling and Yang Intellectual Property

(57) ABSTRACT

An intelligent control method for engine initiation, including: determining whether a current driving mode satisfies a
(Continued)

predetermined driving mode; when the current driving mode satisfies the predetermined driving mode, acquiring a current remaining capacity of a battery; determining whether the current remaining capacity is greater than a predetermined capacity threshold value; when the current remaining capacity is greater than the predetermined capacity threshold value, not starting an engine, otherwise, acquiring a catalyst temperature and a vehicle operating state; determining, according to the vehicle operating state, whether the catalyst temperature is less than a predetermined temperature threshold value; when the catalyst temperature is not less than the predetermined temperature threshold value, driving the engine to rotate clockwise to start same in a fuel cut-off manner, otherwise, heating a catalyst by a heating plate until the catalyst temperature is not less than the predetermined temperature threshold value.

8 Claims, 3 Drawing Sheets

(58) Field of Classification Search
USPC .................................. 701/103–105, 113–114
See application file for complete search history.

(56) References Cited

U.S. PATENT DOCUMENTS

| 2012/0072063 | A1  | 3/2012  | Kato et al. |             |
|--------------|-----|---------|-------------|-------------|
| 2013/0035815 | A1* | 2/2013  | Ando        | B60W 10/06  |
|              |     |         |             | 180/65.265  |
| 2014/0338642 | A1* | 11/2014 | Kamijo      | F02N 11/0814|
|              |     |         |             | 123/179.4   |
| 2016/0325731 | A1* | 11/2016 | Yamazaki    | B60K 6/48   |
| 2019/0161070 | A1  | 5/2019  | Kamatani et al. |         |
| 2020/0223426 | A1* | 7/2020  | Hara        | B60L 50/66  |

FOREIGN PATENT DOCUMENTS

| CN | 102427981 A      | 4/2012  |
|----|------------------|---------|
| CN | 105691182 A      | 6/2016  |
| CN | 106740814 A      | 5/2017  |
| CN | 107878179 A      | 4/2018  |
| CN | 108313059 A      | 7/2018  |
| CN | 108454618 A      | 8/2018  |
| CN | 109291807 A      | 2/2019  |
| CN | 109667653 A      | 4/2019  |
| CN | 111196266 A      | 5/2020  |
| CN | 111479989 A      | 7/2020  |
| CN | 111828189 A      | 10/2020 |
| CN | 112523844 A      | 3/2021  |
| EP | 2433842 A1       | 3/2012  |
| GB | 2576890 A        | 3/2020  |
| JP | 2007-276510 A    | 10/2007 |
| JP | 2011105133 A     | 6/2011  |
| JP | WO2010134163 A1  | 11/2012 |
| JP | 2013-159176 A    | 8/2013  |

OTHER PUBLICATIONS

Hanbing Wei et al., Impact Analysis of Heated Energy in HEV for Three Way Catalyst's Efficiency, Fuel Consumption and Emission, China Mechanical Engineering, 2013, 24(18).

International Search Report for PCT/CN2021/131720 dated Feb. 24, 2022.

Notice of Allowance dated Nov. 17, 2021 for Chinese Patent Application No. 202011332449.X and English Translation.

Office Action dated Jul. 16, 2021 for Chinese Patent Application No. 202011332449.X and English Translation.

* cited by examiner

INTELLIGENT CONTROL METHOD, APPARATUS, STORAGE MEDIUM AND DEVICE FOR ENGINE INITIATION

CROSS-REFERENCE TO RELATED APPLICATIONS

The present application is a U.S. National Phase Entry of International Application PCT/CN2021/131720 having an international filing date of Nov. 19, 2021, which claims priority of Chinese patent application No. 202011332449.X, filed on Nov. 24, 2020 and entitled "Intelligent Control Method, Apparatus and Device for Engine Ignition, and Storage Medium". The entire contents of the above-identified applications are hereby incorporated by reference.

TECHNICAL FIELD

The present disclosure relates to the technical field of engines, in particular to a method, an apparatus, a storage medium and device for intelligent control of engine initiation.

BACKGROUND

With increasingly serious environmental pollution, and tighter emission regulations, many automobile manufacturers take reducing exhaust emission as a research priority. In order to reduce exhaust emission, it is necessary to improve the emission at a start-up stage of the engine. Researchers found that the emission at the start-up stage can be reduced by addition of electric heating for heating a three-way catalytic converter at the start-up stage.

A conversion efficiency of the three-way catalytic converter is determined by its own temperature. When the temperature of three-way catalytic converter is low, the conversion efficiency is almost 0; when the temperature of three-way catalytic converter reaches an initiation temperature, which is generally about 250° C., its conversion efficiency can reach up to 50%; when the temperature reaches about 600° C., the conversion efficiency can reach up to 95%; in a vehicle without an electric heating plate, exhaust gas of an internal combustion engine is usually used for heating the catalytic converter, which will lead to higher emission during the start-up of the internal combustion engine.

Nowadays, with the depletion of traditional energy, in order to use energy more efficiently, hybrid vehicle has become a focus of automobile research and development due to its characteristics of energy saving and low emission. It can not only make internal combustion engine operate in high-efficiency regions a large proportion of, but also expand a cruising range of pure electric vehicles. Depending on different installation position of a motor, different hybrid power structures are defined, including: P0—the motor is at a front end of an internal combustion engine; P1—the motor is at an output end of the engine; P2—the motor is at an input end of a transmission after clutch, etc. Generally, hybrid power with one motor is selected as a scheme of hybrid vehicle, wherein in order to reduce the emission of the internal combustion engine during cold start, for the hybrid vehicle, a dedicated electric heating catalytic converter is taken into consideration, and the catalytic converter is heated to a certain extent before starting the internal combustion engine.

At present, in control of hybrid automobile based on electric heating catalytic converter in the market, the catalytic converter is electrically heated before the cold start of internal combustion engine. That is, a control unit sends out an electric heating instruction to heat the catalytic converter only after determining that the internal combustion engine is to be cold started, and the internal combustion engine is started after the heating is completed. Thus, there are two problems to be faced with:

1) with the increase of capacity of high-voltage batteries, hybrid electric vehicles can run in pure electric mode for a long time, but when a state of charge (SOC) of a high-voltage battery is lower than a certain threshold, the temperature of catalytic converter may be relatively low when the internal combustion engine is started, and catalytic conversion with a high efficiency cannot be achieved;

2) the catalytic converter is heated before the cold start of the internal combustion engine, however, in order to ensure the success and stability of the start-up process of the internal combustion engine, original emission of the internal combustion engine is still very high due to the enrichment of the start-up process.

Therefore, the above problems are to be solved urgently by those skilled in the art.

SUMMARY

Aiming at the above problems in the prior art, a purpose of the present disclosure is to provide a method, an apparatus, a storage medium and a device for intelligent control of engine initiation, which can heat a catalytic converter by a heating plate in a pure electric drive mode or a hybrid drive mode, and the engine is started with fuel cut-off when a certain temperature is reached.

In order to solve the above problems, the present disclosure provides a method for intelligent control of engine initiation, including the following steps:

acquiring a current drive mode of a vehicle;

determining whether the current drive mode meets a first predetermined drive mode, wherein the first predetermined drive mode is one of a pure electric drive mode or a hybrid drive mode;

acquiring current remaining capacity of a battery when the current drive mode meets the first predetermined drive mode;

determining whether the current remaining capacity is greater than a first predetermined capacity threshold, wherein the first predetermined capacity threshold is a sum of a capacity value required for starting an engine, a capacity threshold required for heating a catalytic converter by a heating plate and a capacity threshold required for operating the vehicle in the pure electric drive mode;

no need to start the engine when the current remaining capacity is greater than the first predetermined capacity threshold;

determining whether an operating state of the vehicle meets a predetermined operating state when the current remaining capacity is not greater than the first predetermined capacity threshold, wherein the predetermined operating state is represented as the vehicle being not in an acceleration state or a torque increasing state;

acquiring a temperature of the catalytic converter when the operating state of the vehicle meets the predetermined operating state;

determining whether the temperature of the catalytic converter is less than a first predetermined temperature threshold;

starting the engine to rotate forward with fuel cut-off when the temperature of the catalytic converter is not less than the first predetermined temperature threshold; and heating the catalytic converter by the heating plate to not less than the first predetermined temperature threshold when the temperature of the catalytic converter is less than the first predetermined temperature threshold.

Further, determining whether the operating state of the vehicle meets the predetermined operating state further includes the step of:

starting the engine to rotate forward without fuel cut-off when the operating state of the vehicle does not meet the predetermined operating state.

Further, acquiring the temperature of the catalytic converter when the operating state of the vehicle meets the predetermined operating state further includes the steps of:

determining whether the current remaining capacity is greater than a second predetermined capacity threshold when the operating state of the vehicle is the predetermined operating state; and acquiring the temperature of the catalytic converter when the current remaining capacity is greater than the second predetermined capacity threshold.

Further, the second predetermined capacity threshold is represented as a capacity value required for the vehicle's operating in the pure electric drive mode.

Further, when the current drive mode does not meet the first predetermined drive mode, it further includes the following steps:

acquiring an engine start mode;

determining whether the engine start mode meets a predetermined start mode;

starting the engine to rotate forward without fuel cut-off when the engine start mode does not meet the predetermined start mode;

heating the catalytic converter by the heating plate when the engine start mode meets the predetermined start mode;

starting the engine to rotate forward with fuel cut-off when the temperature of the catalytic converter is heated to be greater than the first predetermined temperature threshold.

Further, when the current drive mode does not meet the first predetermined drive mode, the current drive mode is an engine drive mode.

Further, the predetermined start mode is represented by starting the engine where the catalytic converter is heating by the heating plate.

The present disclosure protects a control apparatus for an engine initiated by a catalytic converter, including:

a drive mode acquisition module configured to acquire a current drive mode of a vehicle;

a first logic module configured to determine whether the current drive mode meets a first predetermined drive mode;

a remaining capacity acquisition module configured to acquire current remaining capacity of a battery when the current drive mode meets the first predetermined drive mode;

a second logic module configured to determine whether the current remaining capacity is greater than a first predetermined capacity threshold, wherein the first predetermined capacity threshold is a sum of a capacity value required for starting the engine a capacity threshold required for heating the catalytic converter by a heating plate and the capacity threshold required for operating the vehicle in the pure electric drive mode;

a first execution module configured not to start the engine when the current remaining capacity is greater than the first predetermined capacity threshold;

a third logic module configured to determine whether an operating state of the vehicle meets a predetermined operating state when the current remaining capacity is not greater than the first predetermined capacity threshold, wherein the predetermined operating state is represented as the vehicle being not in an acceleration state or a torque increasing state;

a catalytic converter temperature acquisition module configured to acquire a temperature of the catalytic converter when the operating state of the vehicle meets the predetermined operating state;

a fourth logic module configured to determine whether the temperature of the catalytic converter is less than the first predetermined temperature threshold;

a second execution module configured to start the engine to rotate forward with fuel cut-off when the temperature of the catalytic converter is not less than the first predetermined temperature threshold; and a third execution module configured to heat the catalytic converter to not less than the first predetermined temperature threshold by the heating plate when the temperature of the catalytic converter is less than the first predetermined temperature threshold.

The present disclosure protects a computer-readable storage medium in which at least one instruction or at least one program is stored, and the at least one instruction or the at least one program is loaded and executed by a processor to implement the method for intelligent control of engine initiation according to any one of the above description.

The present disclosure protects a device for intelligent control of engine initiation, and the device includes a processor and a memory, wherein at least one instruction or at least one program is stored in the memory, the at least one instruction or the at least one program is loaded and executed by the processor to implement the method for intelligent control of engine initiation according to any one of the above description.

Due to the above technical solutions, the present disclosure has the following beneficial effects:

1) In the method, the apparatus, the storage medium and the device for intelligent control of engine initiation according to the present disclosure. In a pure electric drive mode or a hybrid drive mode, a catalytic converter is heated by a heating plate, and the engine is initiated with fuel cut-off when the catalytic converter is heated to a certain temperature, which facilitates engine starting and reduces exhaust gas emission and starting time;

2) In the method, the apparatus, the storage medium and the device for intelligent control of engine initiation according to the present disclosure. When the engine is started, it can be started with fuel cut-off, and gas flow is accelerated to conduct the heat of the heating plate to the catalytic converter without heating the catalytic converter, thus saving cost;

3) In the method, the apparatus, the storage medium and the device for intelligent control of engine initiation according to the present disclosure. The motor controls the engine to rotate forward, so that an engine starting stage can be omitted, and the fuel consumption, exhaust emission and starting time in the starting stage can be reduced.

BRIEF DESCRIPTION OF DRAWINGS

In order to more clearly illustrate technical solutions of the present disclosure, a brief description of drawings required for use in the description of embodiments or prior art will be given below. It is apparent that the accompanying drawings described below are only some embodiments of the present disclosure, and other drawings may be obtained from these drawings by those of ordinary skills in the art without creative effort.

Figure 1:
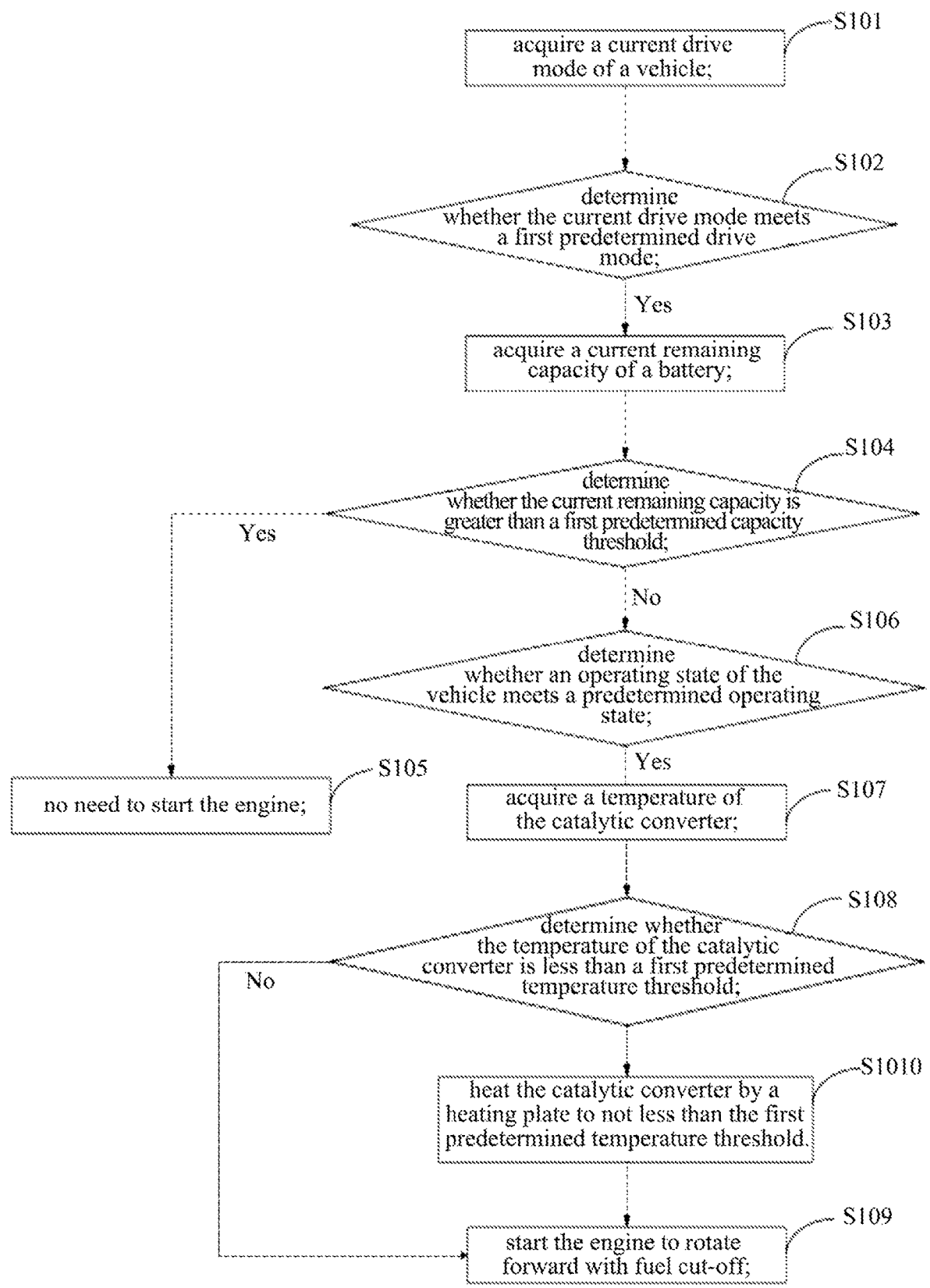
FIG. 1 is a flowchart of a method for intelligent control of engine initiation according to a first embodiment of the present disclosure.

drive mode acquisition module; 20 first logic module; 30 remaining capacity acquisition module; 40 second logic module; 50 first execution module; 60 third logic module; 70 catalytic converter temperature acquisition module; 80 fourth logic module; 90 second execution module; 100 third execution module.

DETAILED DESCRIPTION

A clear and complete description of the technical solutions of the embodiments of the present disclosure will be given below with reference the accompanying drawings of the embodiments of the present disclosure, and it is apparent that the described embodiments are only part of the embodiments of the present disclosure rather than all of them. Based on the embodiments in the present disclosure, all other embodiments obtained by those of ordinary skills in the art without making creative efforts are within the scope of protection of the present disclosure.

"one embodiment" or "embodiments" herein refers to a particular feature, structure, or characteristic that may be included in at least one implementation of the present disclosure. In the description of the present disclosure, it should be understood that orientation or position relationships indicated by terms "upper", "lower", "left", "right", "top", "bottom" and the like are based on the orientation or position relationships shown in the drawings, which are only for convenience of describing the present disclosure and simplifying the description, rather than indicating or implying that the device or element referred to has a specific orientation, be constructed and operated in the specific orientation, and thus cannot be interpreted as a limitation on the present disclosure. Furthermore, terms "first" and "second" are used for descriptive purposes only and cannot be understood as indicating or implying relative importance or implying the quantity of technical features indicated. Thus, a feature defined with "first" and "second" may explicitly or implicitly include one or more of such features. Moreover, the terms "first" and "second" and the like are used to distinguish similar objects and need not be used to describe a particular order or priority. It should be understood that data used in such way can be interchanged when appropriate, so that the embodiments of the present disclosure described herein can be implemented in an order other than those illustrated or described herein.

First Embodiment

As shown in FIG. 1, the first embodiment provides a method for intelligent control of engine initiation, as shown in FIG. 1, the method includes the following steps:

S101: acquiring a current drive mode of a vehicle;

S102: determining whether the current drive mode meets a first predetermined drive mode, wherein the first predetermined drive mode is one of a pure electric drive mode or a hybrid drive mode;

S103: acquiring a current remaining capacity of a battery when the current drive mode meets the first predetermined drive mode;

S104: determining whether the current remaining capacity is greater than a first predetermined capacity threshold, wherein the first predetermined capacity threshold is a sum of a capacity value required for starting an engine, a capacity threshold required for heating a catalytic converter by a heating plate and a capacity threshold required for operating the vehicle in the pure electric drive mode;

S105: no need to start the engine when the current remaining capacity is greater than the first predetermined capacity threshold;

S106: determining whether an operating state of the vehicle meets a predetermined operating state when the current remaining capacity is not greater than the first predetermined capacity threshold, wherein the predetermined operating state is represented as the vehicle being not in an acceleration state or a torque increasing state;

S107: acquiring a temperature of the catalytic converter when the operating state of the vehicle meets the predetermined operating state;

S108: determining whether the temperature of the catalytic converter is less than a first predetermined temperature threshold;

S109: starting the engine to rotate forward with fuel cut-off when the temperature of the catalytic converter is not less than the first predetermined temperature threshold;

S1010: heating the catalytic converter by a heating plate to not less than the first predetermined temperature threshold when the temperature of the catalytic converter is less than the first predetermined temperature threshold.

Specifically, the first predetermined capacity threshold is 23.5-25% of a total capacity of the battery, and the total capacity of the battery is 10 KWH, preferably, the first predetermined capacity threshold is 24% of the total capacity of the battery.

Specifically, the first predetermined temperature threshold is 240-260° C., preferably, the first predetermined temperature threshold is 250° C.

Specifically, in the S109 step, when starting the engine, the engine can be started with fuel cut-off, and the gas flow can be accelerated to conduct the heat of the heating plate to the catalytic converter, so that the catalytic converter does not need to be heated, thus saving cost.

Specifically, heating the catalytic converter by the heating plate in the step S1010 includes two situations:

In a first case, the engine needs to be started for the first time, and the temperature of the catalytic converter meets the condition of heating the catalytic converter by the heating plate, and only the catalytic converter needs to be heated by the heating plate;

In a second case, the engine needs to be started during operating of the vehicle, and the temperature of the catalytic converter meets the condition of heating the catalytic converter by the heating plate, so only the catalytic converter needs to be heated by the heating plate.

Specifically, a process of heating the catalytic converter by the heating plate is as follows: the motor drives the engine to rotate, the rotation of the engine makes the gas flow through and heated by the heating plate, and then makes the heated gas enter the catalytic converter to heat the whole catalytic converter.

Specifically, determining whether the operating state of the vehicle meets the predetermined operating state further includes the step of:

starting the engine to rotate forward without fuel cut-off when the operating state of the vehicle does not meet the predetermined operating state.

Specifically, acquiring the temperature of the catalytic converter when the operating state of the vehicle meets the predetermined operating state further includes the steps of:

determining whether the current remaining capacity is greater than a second predetermined capacity threshold when the operating state of the vehicle is the predetermined operating state; and acquiring the temperature of the catalytic converter when the current remaining capacity is greater than the second predetermined capacity threshold.

Specifically, the second predetermined capacity threshold is represented as a capacity value required for the vehicle's operating in the pure electric drive mode.

Further, the second predetermined capacity threshold is 22-23% of the total capacity of the battery, and the total capacity of the battery is 10 KWH, preferably, the second predetermined capacity threshold is 23% of the total capacity of the battery.

Figure 2:
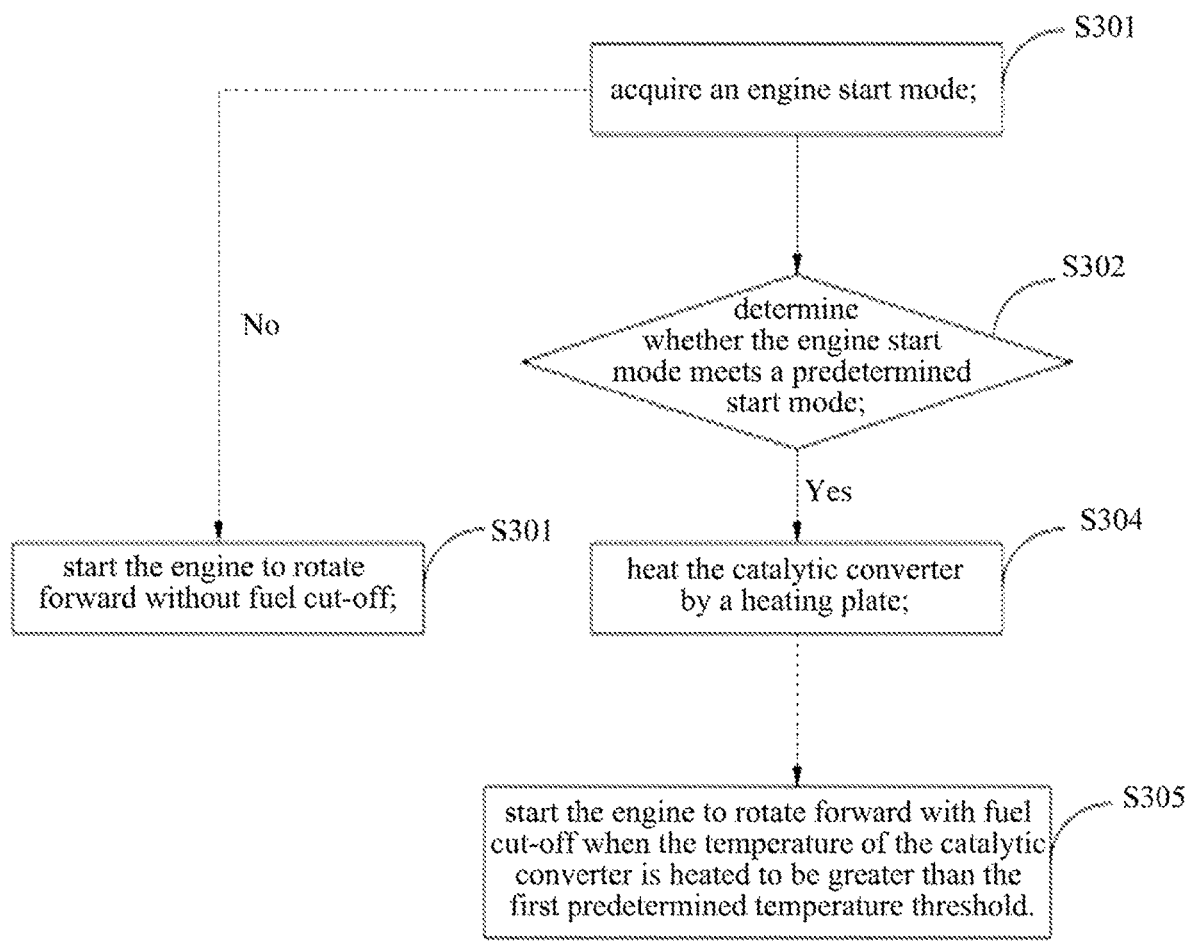
FIG. 2 is a flowchart of step S102 according to the first embodiment of the present disclosure.

As shown in FIG. 2, when the current drive mode does not meet the first predetermined drive mode, it further includes the following steps:

S301: acquiring an engine start mode;
S302: determining whether the engine start mode meets a predetermined start mode;
S303: starting the engine to rotate forward without fuel cut-off when the engine start mode does not meet the predetermined start mode;
S304: heating the catalytic converter by a heating plate when the engine start mode meets the predetermined start mode; and
S305: starting the engine to rotate forward with fuel cut-off when the temperature of the catalytic converter is heated to be greater than the first predetermined temperature threshold.

Specifically, when the current drive mode does not meet the first predetermined drive mode, the current drive mode is an engine drive mode.

Specifically, the predetermined start mode is represented by starting the engine where the catalytic converter is heating by the heating plate.

Specifically, the forward rotation of the engine is controlled by the motor, so that the engine starting stage can be omitted and fuel consumption, exhaust gas emissions and starting time in the starting stage can be reduced.

Figure 3:
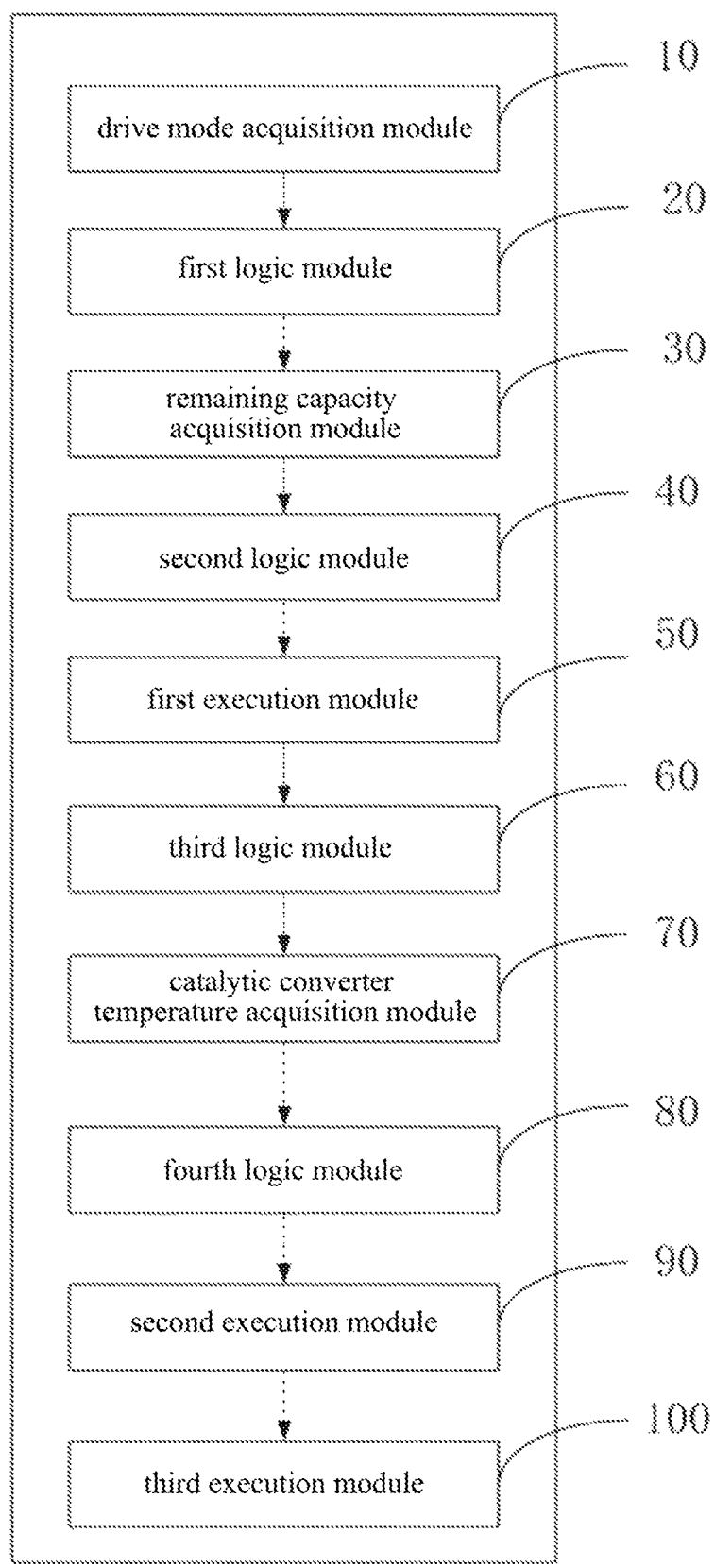
FIG. 3 is a schematic structural diagram of an apparatus for intelligent control of engine initiation according to the first embodiment of the present disclosure.

As shown in FIG. 3, the first embodiment further provides an apparatus for intelligent control of engine initiation. The control apparatus is used for implementing the method for intelligent control of engine initiation. The control apparatus includes:

a drive mode acquisition module 10 configured to acquire a current drive mode of a vehicle;

a first logic module 20 configured to determine whether the current drive mode meets a first predetermined drive mode;

a remaining capacity acquisition module 30 configured to acquire current remaining capacity of a battery when the current drive mode meets the first predetermined drive mode;

a second logic module 40 configured to determine whether the current remaining capacity is greater than a first predetermined capacity threshold, wherein the first predetermined capacity threshold is a sum of a capacity value required for starting the engine, a capacity threshold required for heating the catalytic converter by the heating plate and a capacity threshold required for operating the vehicle in a pure electric drive mode;

a first execution module 50 configured not to start the engine when the current remaining capacity is greater than the first predetermined capacity threshold;

a third logic module 60 for determining whether the operating state of the vehicle meets a predetermined operating state when the current remaining capacity is not greater than the first predetermined capacity threshold, wherein the predetermined operating state is represented as the vehicle being not in an acceleration state or a torque increasing state;

a catalytic converter temperature acquisition module 70 configured to acquire the temperature of the catalytic converter when the operating state of the vehicle meets the predetermined operating state;

a fourth logic module 80 configured to determine whether the temperature of the catalytic converter is less than a first predetermined temperature threshold;

a second execution module 90 configured to start the engine to rotate forward with fuel cut-off when the temperature of the catalytic converter is not less than the first predetermined temperature threshold;

a third execution module 100 configured to heat the catalytic converter to not less than the first predetermined temperature threshold by the heating plate when the temperature of the catalytic converter is less than the first predetermined temperature threshold.

The embodiment further provides a device for intelligent control of engine initiation, and the device includes a processor and a memory, wherein at least one instruction or at least one program is stored in the memory, the at least one instruction or the at least one program is loaded and executed by the processor to implement the method for intelligent control of engine initiation according to anyone of the above description.

The embodiment further provides a computer-readable storage medium in which at least one instruction or at least one program is stored, and the at least one instruction or the at least one program is loaded and executed by a processor to realize the method for intelligent control of engine initiation according to anyone of the above description.

The embodiment further provides a system for intelligent control of engine initiation, which includes a motor, an engine, a catalytic converter and the above control apparatus for engine initiation by a catalytic converter.

The motor, the engine and the catalytic converter are each electrically connected with the apparatus for intelligent control of engine initiation, and the apparatus for intelligent control of engine initiation controls the engine to be initiated through the catalytic converter.

Specifically, the control device further includes: a capacity detection apparatus and a temperature sensor.

The capacity detection apparatus is configured to measure the current remaining capacity of a battery;

The temperature sensor is configured to measure a current temperature of the catalytic converter.

The first embodiment provides a method, an apparatus, a storage medium and a device for intelligent control of engine initiation, so that the catalytic converter can be heated by the heating plate in the pure electric drive mode or hybrid drive mode, and when the catalytic converter reaches a certain temperature, the engine will be initiated with fuel cut-off, which facilitates engine starting and reduces the exhaust emission and starting time.

It is noted that each of the foregoing method embodiments has been described as a series of action combination for simplicity of description, but those skilled in the art will appreciate that the present disclosure is not limited by the sequence of actions described, since certain steps may be performed in other sequences or simultaneously according to the present disclosure. Similarly, the above-mentioned modules of the apparatus for intelligent control of engine initiation refer to computer programs or program segments for performing one or more specific functions. In addition, distinction between the above-mentioned modules does not mean that the actual program codes must also be separated. In addition, the above embodiments can be randomly combined with each other to obtain other embodiments.

In the above embodiments, the description of each embodiment has its own emphasis, and for parts not described in detail in certain embodiments, reference may be made to the related description of other embodiments. Those skilled in the art will also appreciate that various illustrative logical blocks, units, and steps listed in embodiments of the present disclosure may be implemented by electronic hardware, computer software, or a combination of both. In order to clearly demonstrate the interchangeability of hardware and software, the functions of the illustrative components, units and steps described above have been generally described. Whether such function is implemented by hardware or software depends on the specific application and the design requirements of the whole system. A person skilled in the art may implement the described functionality using a variety of methods for each particular application, but such implementation should not be construed as being beyond the scope of protection of embodiments of the present disclosure.

Those of ordinary skills in the art will appreciate that all or part of the steps to implement the above embodiments may be performed by hardware, or by instructing the related hardware through a program that may be stored in a computer-readable storage medium, such as a read-only memory, a magnetic disk, or the like.

The above description has fully disclosed specific embodiments of the present disclosure. It is to be noted that any change made by a person skilled in the art to a specific embodiment of the present disclosure does not depart from the scope of the claims of the present disclosure. Accordingly, the scope of the claims of the present disclosure is not solely limited to the foregoing specific embodiments.

The invention claimed is:

1. A method for intelligent control of engine initiation, comprising following steps:
acquiring a current drive mode of a vehicle;
determining whether the current drive mode meets a first predetermined drive mode, wherein the first predetermined drive mode is one of a pure electric drive mode or a hybrid drive mode;
acquiring current remaining capacity of a battery when the current drive mode meets the first predetermined drive mode;
determining whether the current remaining capacity is greater than a first predetermined capacity threshold, wherein the first predetermined capacity threshold is a sum of a capacity value required for starting an engine, a capacity threshold required for heating a catalytic converter by a heating plate and a capacity threshold required for operating the vehicle in the pure electric drive mode;
no need to start the engine when the current remaining capacity is greater than the first predetermined capacity threshold;
determining whether an operating state of the vehicle meets a predetermined operating state when the current remaining capacity is not greater than the first predetermined capacity threshold, wherein the predetermined operating state is represented as the vehicle being not in an acceleration state or a torque increasing state;
acquiring a temperature of the catalytic converter when the operating state of the vehicle meets the predetermined operating state;
determining whether the temperature of the catalytic converter is less than a first predetermined temperature threshold;
starting the engine to rotate forward with fuel cut-off when the temperature of the catalytic converter is not less than the first predetermined temperature threshold; and
heating the catalytic converter by the heating plate to not less than the first predetermined temperature threshold when the temperature of the catalytic converter is less than the first predetermined temperature threshold;
wherein determining whether the operating state of the vehicle meets the predetermined operating state further comprises a step:
starting the engine to rotate forward without fuel cut-off when the operating state of the vehicle does not meet the predetermined operating state; and
wherein acquiring the temperature of the catalytic converter when the operating state of the vehicle meets the predetermined operating state further comprises steps of:
determining whether the current remaining capacity is greater than a second predetermined capacity threshold when the operating state of the vehicle is the predetermined operating state; and
acquiring the temperature of the catalytic converter when the current remaining capacity is greater than the second predetermined capacity threshold.

2. The method for intelligent control of engine initiation according to claim 1, wherein the second predetermined capacity threshold is represented as a capacity value required for operating of the vehicle in the pure electric drive mode.

3. The method for intelligent control of engine initiation according to claim 1, wherein when the current drive mode does not meet the first predetermined drive mode, the method further comprises following steps:
acquiring an engine start mode;

determining whether the engine start mode meets a predetermined start mode;

starting the engine to rotate forward without fuel cut-off when the engine start mode does not meet the predetermined start mode;

heating the catalytic converter by the heating plate when the engine start mode meets the predetermined start mode;

starting the engine to rotate forward with fuel cut-off when the temperature of the catalytic converter is heated to be greater than the first predetermined temperature threshold.

4. The method for intelligent control of engine initiation according to claim 3, wherein the current drive mode is an engine drive mode when the current drive mode does not meet the first predetermined drive mode.

5. The method for intelligent control of engine initiation according to claim 3, wherein the predetermined start mode is represented as starting the engine where the catalytic converter is heating by the heating plate.

6. A computer-readable storage medium, wherein at least one instruction or at least one program is stored in the storage medium, the at least one instruction or the at least one program is loaded and executed by a processor to implement the method for intelligent control of engine initiation according to claim 1.

7. A device for intelligent control of engine initiation, comprising a processor and a memory, wherein at least one instruction or at least one program is stored in the memory, the at least one instruction or the at least one program is loaded and executed by the processor to implement the method for intelligent control of engine initiation according to claim 1.

8. An apparatus for intelligent control of engine initiation, comprising: a drive mode acquisition module configured to acquire a current drive mode of a vehicle;

a first logic module configured to determine whether the current drive mode meets a first predetermined drive mode, wherein the first predetermined drive mode is one of a pure electric drive mode or a hybrid drive mode;

a remaining capacity acquisition module configured to acquire current remaining capacity of a battery when the current drive mode meets the first predetermined drive mode;

a second logic module configured to determine whether the current remaining capacity is greater than a first predetermined capacity threshold;

a first execution module configured not to start an engine when the current remaining capacity is greater than the first predetermined capacity threshold;

a third logic module configured to determine whether an operating state of the vehicle meets a predetermined operating state when the current remaining capacity is not greater than the first predetermined capacity threshold, wherein the predetermined operating state is represented as the vehicle being not in an acceleration state or a torque increasing state, and wherein determining whether the operating state of the vehicle meets the predetermined operating state further comprises: starting the engine to rotate forward without fuel cut-off when the operating state of the vehicle does not meet the predetermined operating state;

a catalytic converter temperature acquisition module configured to acquire a temperature of a catalytic converter when the operating state of the vehicle meets the predetermined operating state, wherein acquiring the temperature of the catalytic converter when the operating state of the vehicle meets the predetermined operating state further comprises: determining whether the current remaining capacity is greater than a second predetermined capacity threshold when the operating state of the vehicle is the predetermined operating state; and acquiring the temperature of the catalytic converter when the current remaining capacity is greater than the second predetermined capacity threshold;

a fourth logic module configured to determine whether the temperature of the catalytic converter is less than a first predetermined temperature threshold;

wherein the first predetermined capacity threshold is a sum of a capacity value required for starting the engine, a capacity threshold required for heating the catalytic converter by a heating plate and a capacity threshold required for operating the vehicle in the pure electric drive mode;

a second execution module configured to start the engine to rotate forward with fuel cut-off when the temperature of the catalytic converter is not less than the first predetermined temperature threshold; and a third execution module configured to heat the catalytic converter to not less than the first predetermined temperature threshold by the heating plate when the temperature of the catalytic converter is less than the first predetermined temperature threshold.

\* \* \* \* \*